US012535204B2

(12) United States Patent
Plomteux

(10) Patent No.: US 12,535,204 B2
(45) Date of Patent: Jan. 27, 2026

(54) HEATSINK ASSEMBLY AND LUMINAIRE

(71) Applicant: SIGNIFY HOLDING B.V., Eindhoven (NL)

(72) Inventor: Alexandre Plomteux, Montreal (CA)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 18/742,233

(22) Filed: Jun. 13, 2024

(65) Prior Publication Data

US 2025/0244005 A1 Jul. 31, 2025

Related U.S. Application Data

(60) Provisional application No. 63/624,933, filed on Jan. 25, 2024.

(51) Int. Cl.

| | |
|---|---|
| ***F21V 29/00*** | (2015.01) |
| ***F21V 19/00*** | (2006.01) |
| ***F21V 29/74*** | (2015.01) |

(52) U.S. Cl.

CPC ............ *F21V 29/74* (2015.01); *F21V 19/003* (2013.01)

(58) Field of Classification Search

CPC ................................ F21V 19/003; F21V 29/74

See application file for complete search history.

(56) References Cited

U.S. PATENT DOCUMENTS

| | | | | |
|---|---|---|---|---|
| 9,243,794 B2 * | 1/2016 | Wilcox | | F21V 5/04 |
| 2017/0219182 A1 * | 8/2017 | Duarte | | F21S 41/151 |
| 2018/0356058 A1 | 12/2018 | Kuti et al. | | |
| 2019/0242568 A1 * | 8/2019 | Luiten | | H05K 7/20409 |
| 2023/0408079 A1 * | 12/2023 | Voelker | | F21V 29/717 |

FOREIGN PATENT DOCUMENTS

| | | |
|---|---|---|
| CN | 208670921 U | 3/2019 |
| RU | 215279 U1 | 12/2022 |

* cited by examiner

*Primary Examiner* — Gerald J Sufleta, II

(57) ABSTRACT

Certain embodiments are directed to an apparatus comprising a sheet metal heat sink including: a first side; a second side substantially parallel to the first side; a third edge between the first side and the second side; a first slot forming a first corner with the third edge and substantially parallel to the first side and the second side; a second slot forming a second corner with the third edge and substantially parallel to the first side and the second side; and a tab protruding from the third edge.

14 Claims, 7 Drawing Sheets

HEATSINK ASSEMBLY AND LUMINAIRE

CLAIM OF PRIORITY

This application claims priority to "Adaptive Heatsink Door for LED Luminaire", Provisional Application for Patent No. 63/526,035 filed Jul. 11, 2023 in the United States Patent and Trademark Office.

BACKGROUND

1. Field

The disclosure relates to sheet metal heat sinks, and more particularly reducing the costs of producing sheet metal heat sinks.

2. Description of the Related Art

In luminaire enclosure design, a lower portion can hold Light Emitting Diode (LED) boards, while an upper portion acts as a housing for electronic components such as drivers, and connectors. A heat sink dissipates heat from the LED boards. It is important to maintain good contact between the LED boards and the heat sink.

It should be noted that the above information of the background is merely provided for clear and complete explanation of the disclosure and for easy understanding for those skilled in the art. No inference should be drawn that any of the above information is known to those skilled in the art.

SUMMARY

Certain embodiments are directed to an apparatus comprising a sheet metal heat sink including: a first side; a second side substantially parallel to the first side; a third edge between the first side and the second side; a first slot forming a first corner with the third edge and substantially parallel to the first side and the second side; a second slot forming a second corner with the third edge and substantially parallel to the first side and the second side; and a tab protruding from the third edge.

According to certain embodiments, a method comprises: in a sheet metal heat sink 110 having a first edge **118*a* and a second edge parallel 118*b* to the first edge, cutting a first slot 116 parallel to the first edge and a second slot 116 parallel to the second edge 210; affixing a light emitting diode (LED) board 120 to a bottom surface 110*a* of sheet metal heat sink, the LED board comprising a plurality of LEDs 122 220; inserting a tab 114 protruding from a third edge 118*c* of the sheet metal heat sink disposed between the first edge and the second edge into a seating area 138 of a housing 230; providing power from the housing 130 to the plurality of LEDs 240; emitting light from the plurality of LEDs in response to receiving the power 250; and absorbing heat from the plurality of LEDs while emitting light from the plurality of LEDs 260**.

BRIEF DESCRIPTION OF THE DRAWINGS

The above and other aspects, features, and advantages of certain embodiments of the disclosure will be more apparent from the following description taken in conjunction with the accompanying drawings, in which.

A brief description of each drawing is provided to better understand the drawings cited herein.

DETAILED DESCRIPTION

Certain embodiments presented in this disclosure are directed to a luminaire with a heat sink that maintains good thermal contact with a light engine.

Figure 1:
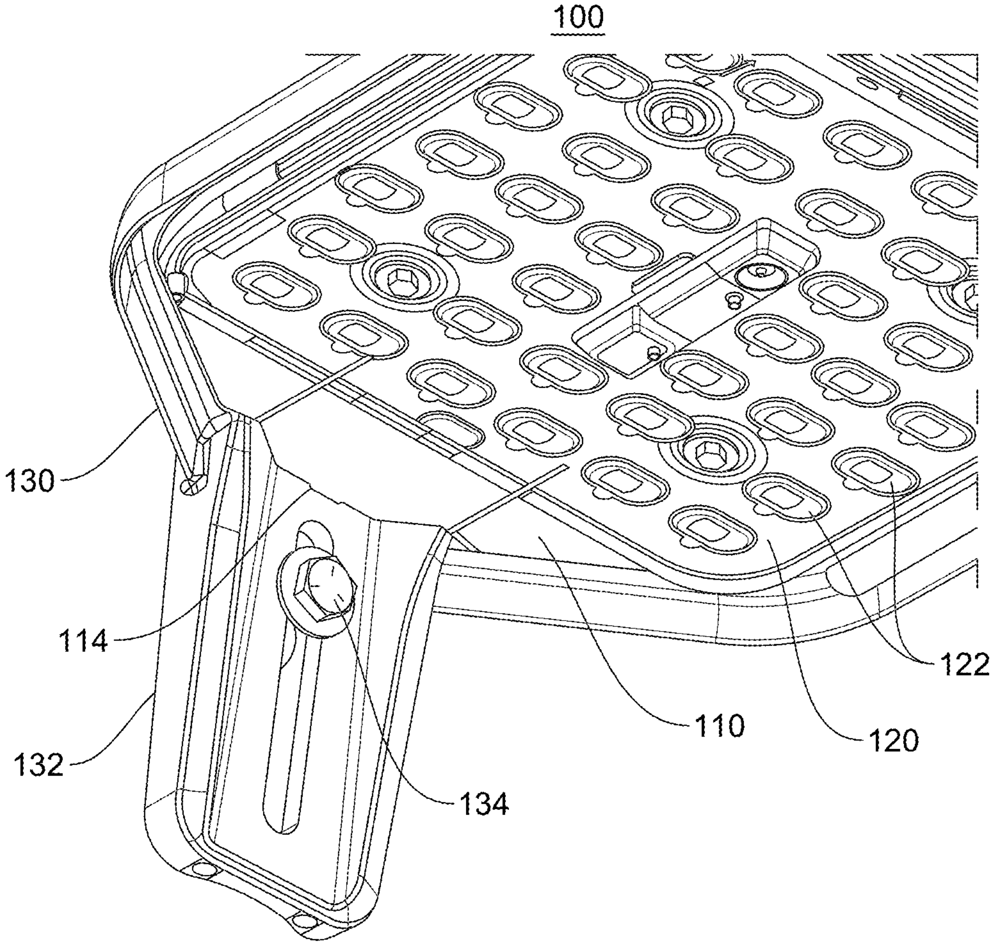
FIG. 1 is a block diagram of a luminaire in accordance with an embodiment of this disclosure.

Referring to FIG. 1, there is illustrated a block diagram of a luminaire 100 in accordance with an embodiment of this disclosure. The luminaire 100 includes a sheet metal heat sink 110, a Light Emitting Diode (LED) board 120, and a housing 130.

The LED board 120 can included a plurality of LEDs 122 disposed on one side. The LEDs 122 can be configured to generate light in response to receiving electrical power. While generating the light, the LEDs 122 may also generate heat. The heat may be hazardous and can potentially destroy the LED board 120 and other parts.

The sheet metal heat sink 110 can form an enclosure and be configured to absorb and dissipate the heat from the LEDs 122. The sheet metal heat sink 110 makes physical contact with the LED board 120. Accordingly, heat from the LEDs 122 is transferred to the sheet metal heat sink 110.

The housing 130 provides support for the LED board 120. The LED board 120 and sheet metal heat sink 110 can be fixed to the housing 130, thereby holding the sheet metal heat sink 110 and LED board 120 in place. Additionally, the housing 130 includes electronic components, such as drivers and connectors. The electronic components form electronic circuits with the LEDs 122. For example, the electronic circuits may connect a power source to the LEDs 122. The housing 130 can include a bracket 132.

The bracket 132 can accommodate a screw 134. The screw 124 can attach the luminaire 100 to another structure.

The weight of the luminaire 100 can cause a downward stress to the portions of the luminaire 100 that are the greatest distance from the bracket 132. Certain embodiments can minimize separation of the sheet metal heat sink 110 from the LED board 120, and thereby minimize or substantially reduce air gaps below sheet metal heat sink 110. An air gap below the sheet metal heat sink 110 would negatively affect thermal contact resistance. Accordingly, the sheet metal heat sink 110 can be fixed to the housing 130 by a single screw and a tab 114. The sheet metal heat sink 110 can include parallel slots 116 with the tab 114 in between. The sheet metal heat sink 110 can also have a hollow center behind it and slots 116. The tab 114 can hook itself at the back portion of the housing 130. The tab 114 can flex and generate a force on the sheet metal heat sink 110 that would push it into the housing 130. The slots 116 can prevent the sheet metal heat sink 110 from bowing. Thus, as will be shown in FIGS. 7-9, when the portion of the luminaire 100 that is farthest from the bracket 132 bends downward, the portion of the sheet metal heat sink 110 between the slots 116 bears most of the displacement from the LED board 120. The remaining portion of the sheet metal heat sink 110 maintains good thermal contact with the LED board 120. The sheet metal heat sink 110 making good thermal contact at the sides of the luminaire allows the luminaire to maintain the LED temperature within a desirable limit.

Figure 2:
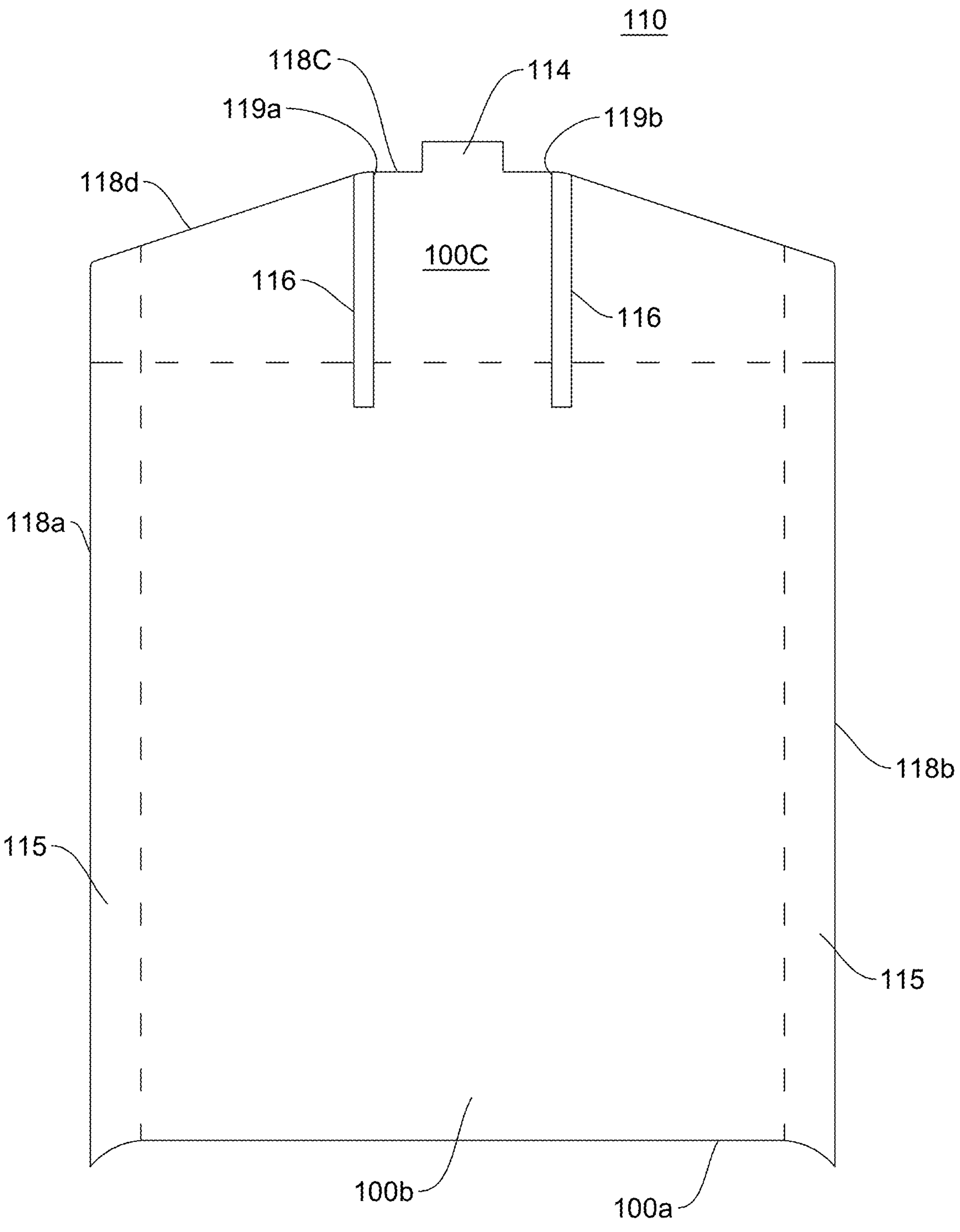
FIG. 2 is a block diagram of a sheet metal heat sink with an embodiment of this disclosure.

Referring to FIG. 2, there is illustrated a block diagram of a sheet metal heat sink 110 in accordance with an embodiment of this disclosure. In certain embodiments, the sheet metal heat sink 110 can be laser cut from sheet metal, wherein the sheet metal comprises a metal alloy comprising any of copper, aluminum, silver, tungsten, and zinc, or other metal with high heat conductivity. The slots 116 can also be cut into the sheet metal heat sink 110. Additionally, the sheet metal heat sink 110 can be generally planar having a bottom surface 110*a* and top surface 110*b*. The sheet metal heat sink 110 can also include a heat sink door 110*c*. The heat sink door 100*c* can the portion that does not contact the LED board 120. The tab 114 can protrude from one edge of the sheet metal heat sink 110.

The sheet metal heat sink 110 can include reinforcing bends 115. The reinforcing bends 115 can make an angle from the remainder of the bottom surface 110*a*. In certain embodiments, the angle 60 degrees, but is not limited to 60 degrees. For example, some embodiments may make a 90-degree angle. The bottom surface 110*a* can be configured to accommodate mounting or affixing of the LED board 120.

In certain embodiments, the sheet metal heat sink 110 can be generally planar. The sheet metal heat sink includes a first edge 118*a* and a second edge 118*b* that is parallel (or substantially parallel) to the first edge 118*a*. The sheet metal heat sink 110 also includes a third edge 118*c* that is disposed between the first edge 118*a* and the second edge 118*b*. The slots 116 form corners with the third edge 118*c*. For example, in the illustration, the left slot 116 forms a first corner 119*a* with the third edge 118*c*, and the right slot 116 forms a second corner 119*b* with the third edge 118*c*. In certain embodiments, the third edge 118*c* can be in a direction that is substantially perpendicular to the first edge 118*a* and the second edge 118*b*. The tab 114 can protrude from the third edge 118*c*. Additionally, a fourth edge 118*d* can connect the first edge 118 to the left slot 116. A fifth edge 118*e* can connect the second edge 118*b* to right slot 116.

Figure 3:
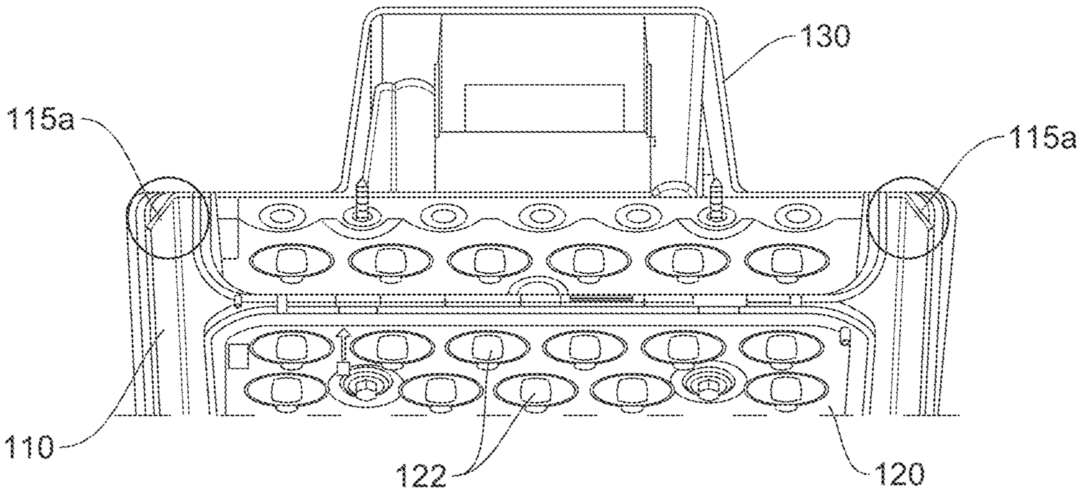
FIG. 3 is a block diagram of the light engine mounted onto the sheet metal heat sink, in accordance with an embodiment of the disclosure.

Referring to FIG. 3 are block diagrams of the LED board 120 mounted onto the sheet metal heat sink 110 in accordance with an embodiment of this disclosure. The reinforcing bends 115*a* correspond to the edges of the LED board 120. Additionally, the reinforcing bends 115*a* can provide lateral support. The housing 130 may be mounted on the top surface 110*b* of the sheet metal heat sink 110. The housing 130 can include electronic components making electrical contact with the LEDs 122.

Figure 4:
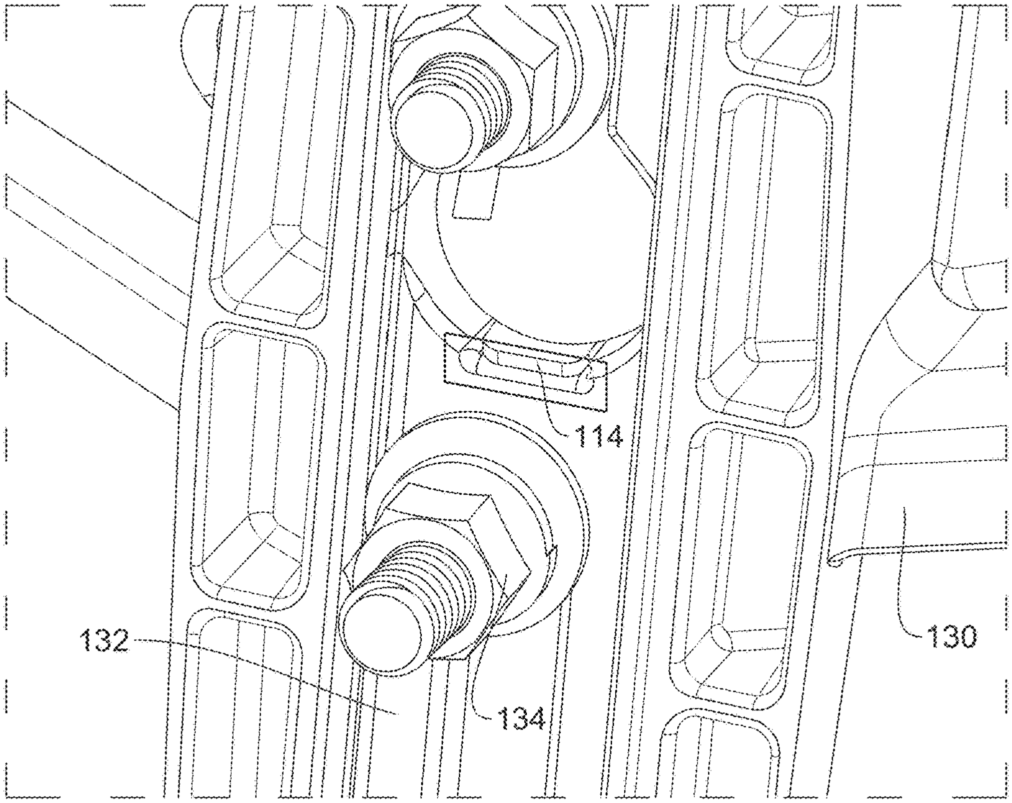
FIG. 4 is a block diagram of an interface between the housing and the tab of the sheet metal heat sink, in accordance with an embodiment of the disclosure.

Referring to FIG. 4, there is illustrated a block diagram of an interface between the housing 130 and the tab 114 of the sheet metal heat sink 110 in accordance with an embodiment of this disclosure. The housing 130 includes a bracket 132. The bracket 132 includes a screw hole to accommodate a screw 134. The LED board 120 is mounted onto the bottom surface 110*a* of the sheet metal heat sink 110.

Additionally, the housing 130 includes a seating area 138 to accommodate the tab 114 of the sheet metal heat sink 110. The housing 130 includes a screw hole 136. The area surrounding the screw hole 136 can be flexible.

Figure 5:
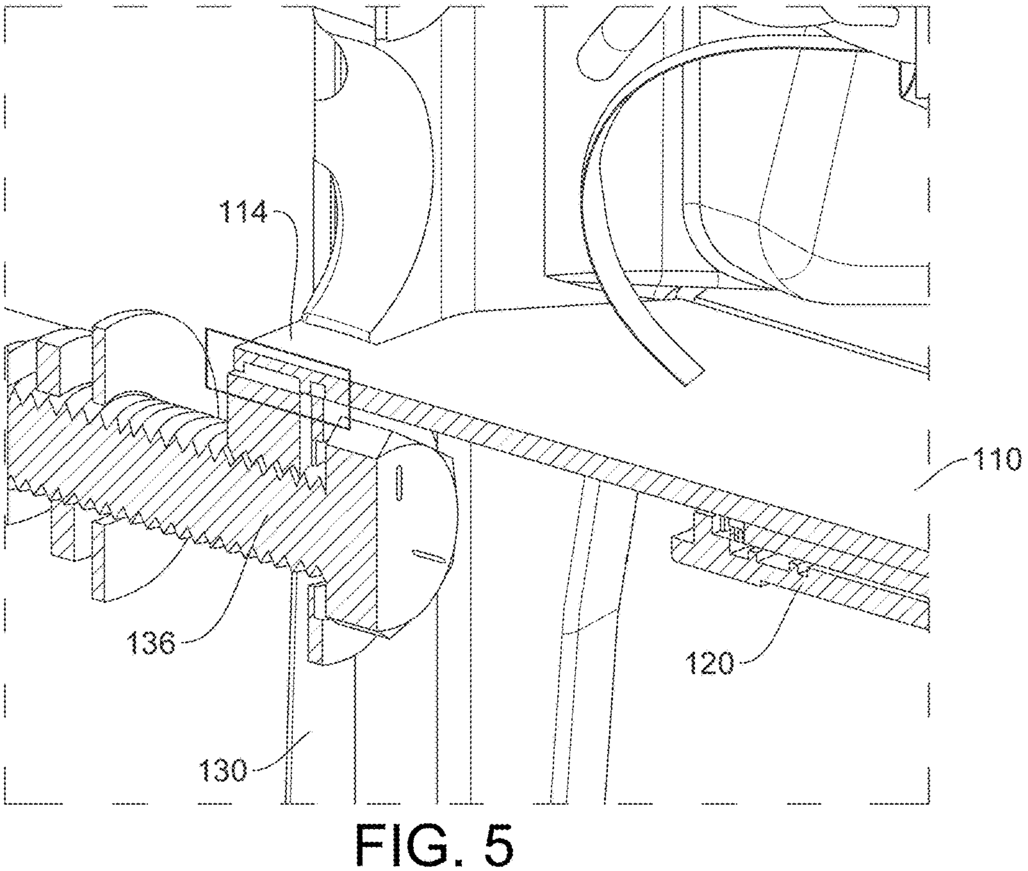
FIG. 5 is a cross-section of the interface between the housing and the tab of the sheet metal heat sink, in accordance with an embodiment of this disclosure.

FIG. 5 is a cross section of the interface between the housing 130 and the tab 114. The interference of the tab 114 generates a force by flexion of the tab 114 of the sheet metal heat sink 110.

Figure 6:
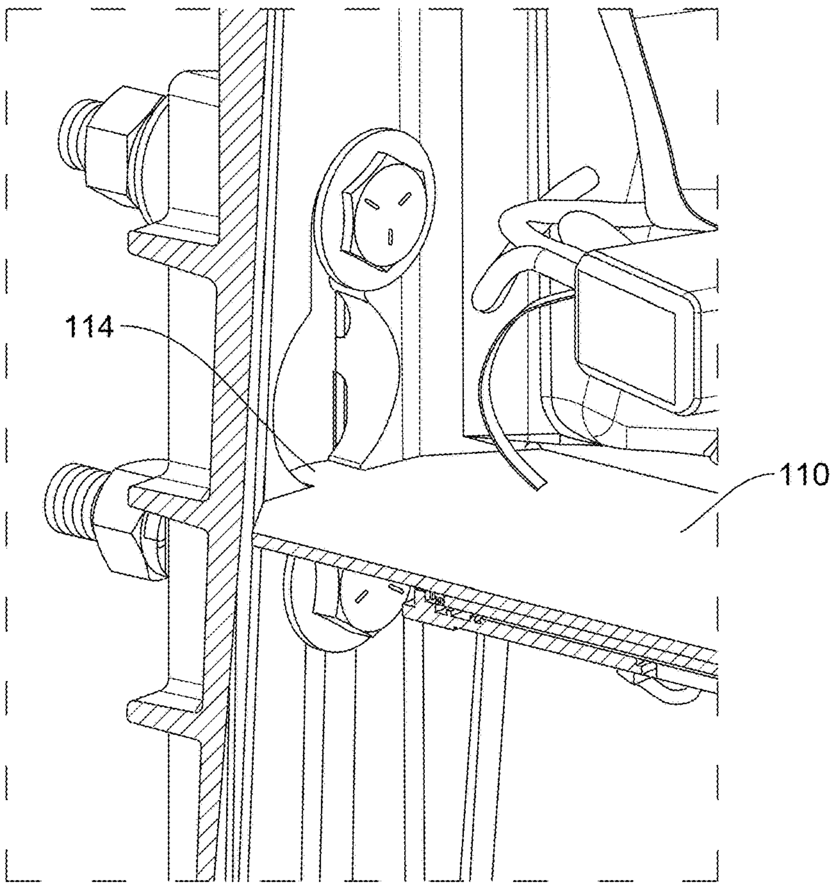
FIG. 6 is a block diagram of another interface between the housing and the tab of the sheet metal heat sink, in accordance with an embodiment of this disclosure.
Figure 7:
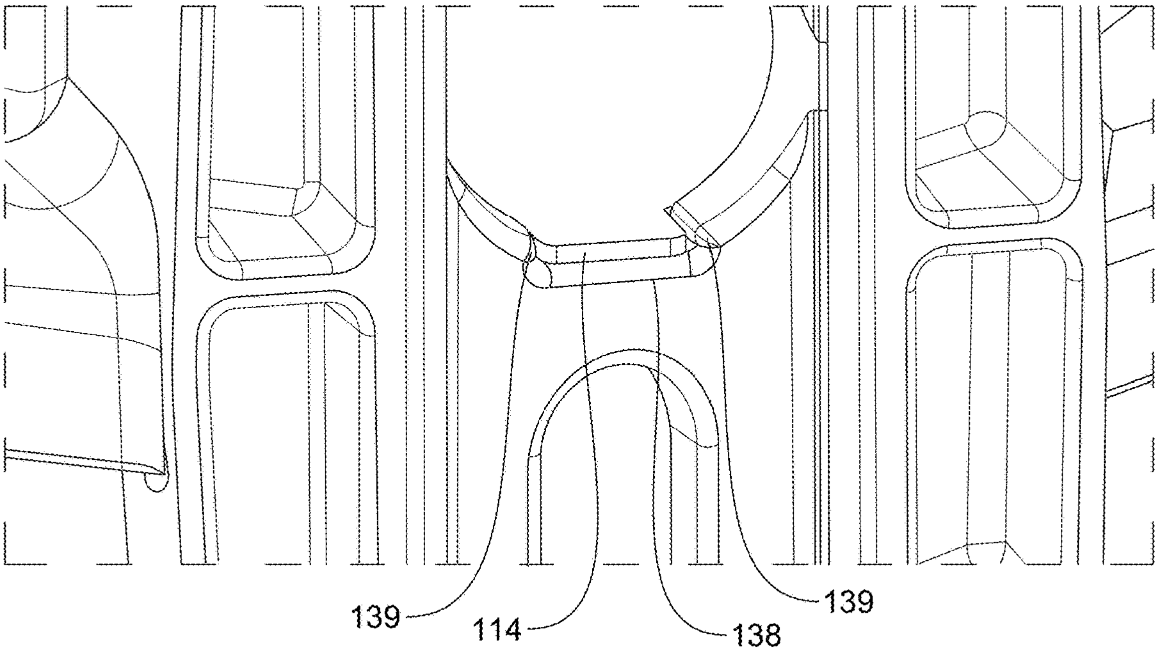
FIG. 7 is a cross section of the interface of FIG. 6.

FIG. 6 illustrates the interface between the sheet metal heat sink 110 and the housing 130 in another embodiment. The LED board 120 is mounted to the bottom surface 110*a* of the sheet metal heat sink 110. The tab 114 of the sheet metal heat sink 110 is disposed in the seating area 138. In the embodiment of FIG. 7, the seating area 138 includes steps 139 that limit lateral movement of the tab 114, such as when vibrations occur.

Figure 8:
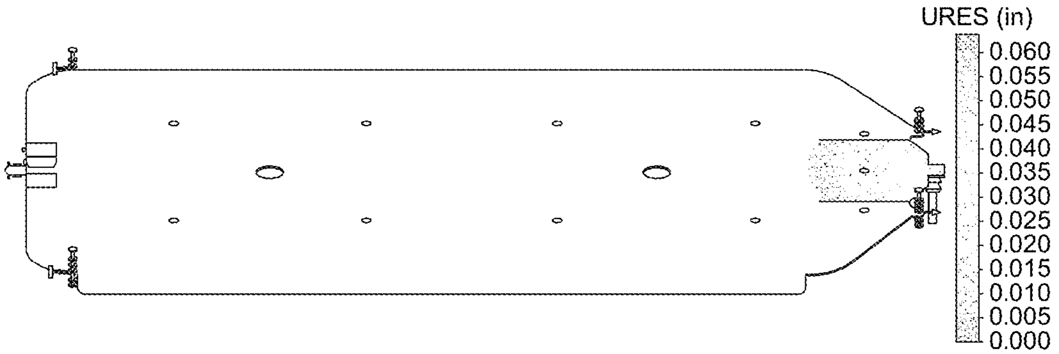
FIGS. 8-10 are diagrams describing the displacement of different parts of the sheet metal heat sink, in accordance with an embodiment of this disclosure.
Figure 9:
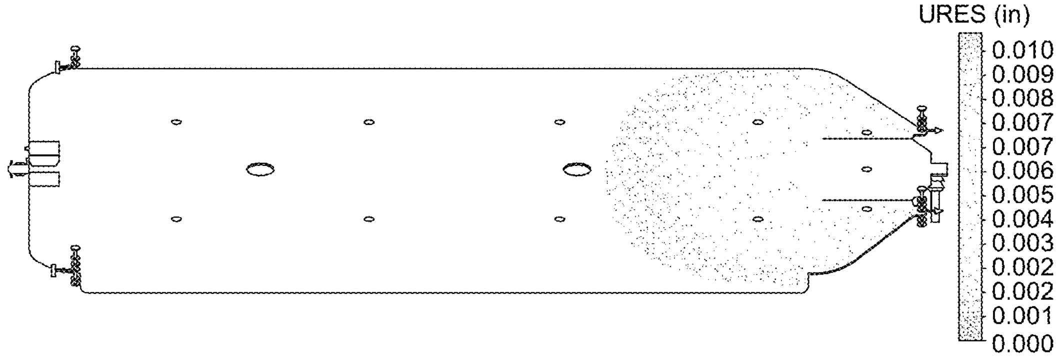
Figure 10:
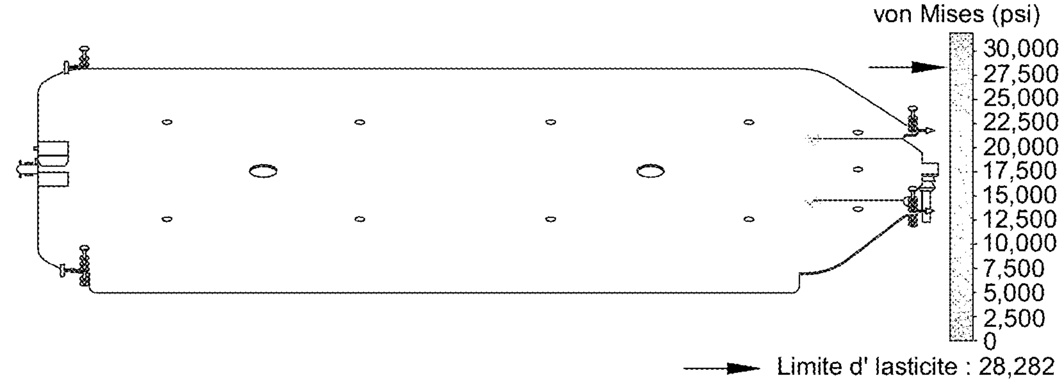

FIGS. 8-10 show the displacement of different parts of the sheet metal heat sink 110 under different conditions. In FIG. 8, the tab 114 has displaced vertically, 0.060". It can be seen that the displacement is mainly at the portion of the sheet metal heat sink 110 between slots 116. In FIG. 9, the tab 114 has displaced vertically, 0.010". Most of the portion of the sheet metal heat sink 110 between slots 116 displaces vertically about 0.010". Most of the displacement is confined to the heat sink door 110*c*. However, the portion of the sheet metal heat sink 110 that is in contact with the LED board 120 has almost negligible displacement. FIG. 10 displays the sheet metal heat sink 110 with 12 kilopounds per square inch (ksi), which is well below the elastic limit of 5052-H32 material. The distribution of stress is mainly around slots 116. However, there is minimal stress distributed in other areas.

Figure 11:
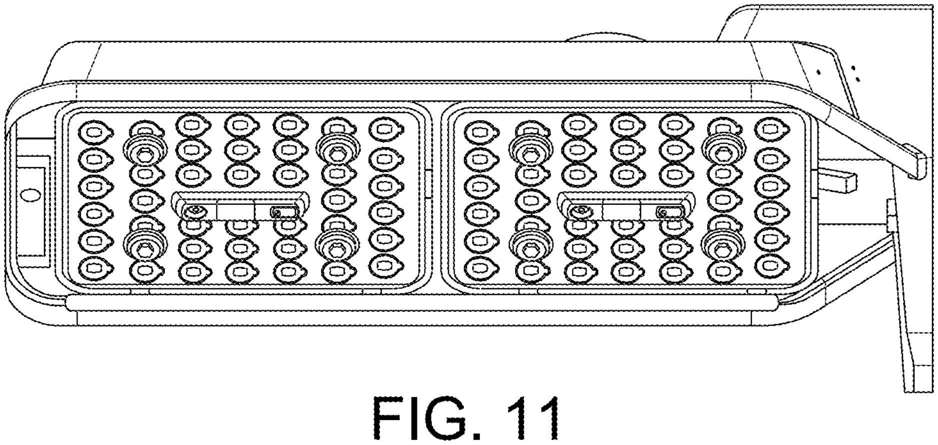
FIG. 11 is a block diagram of a light engine with the heat sink disposed therein.

FIG. 11 is a block diagram of a light engine with the heat sink disposed therein.

Figure 12:
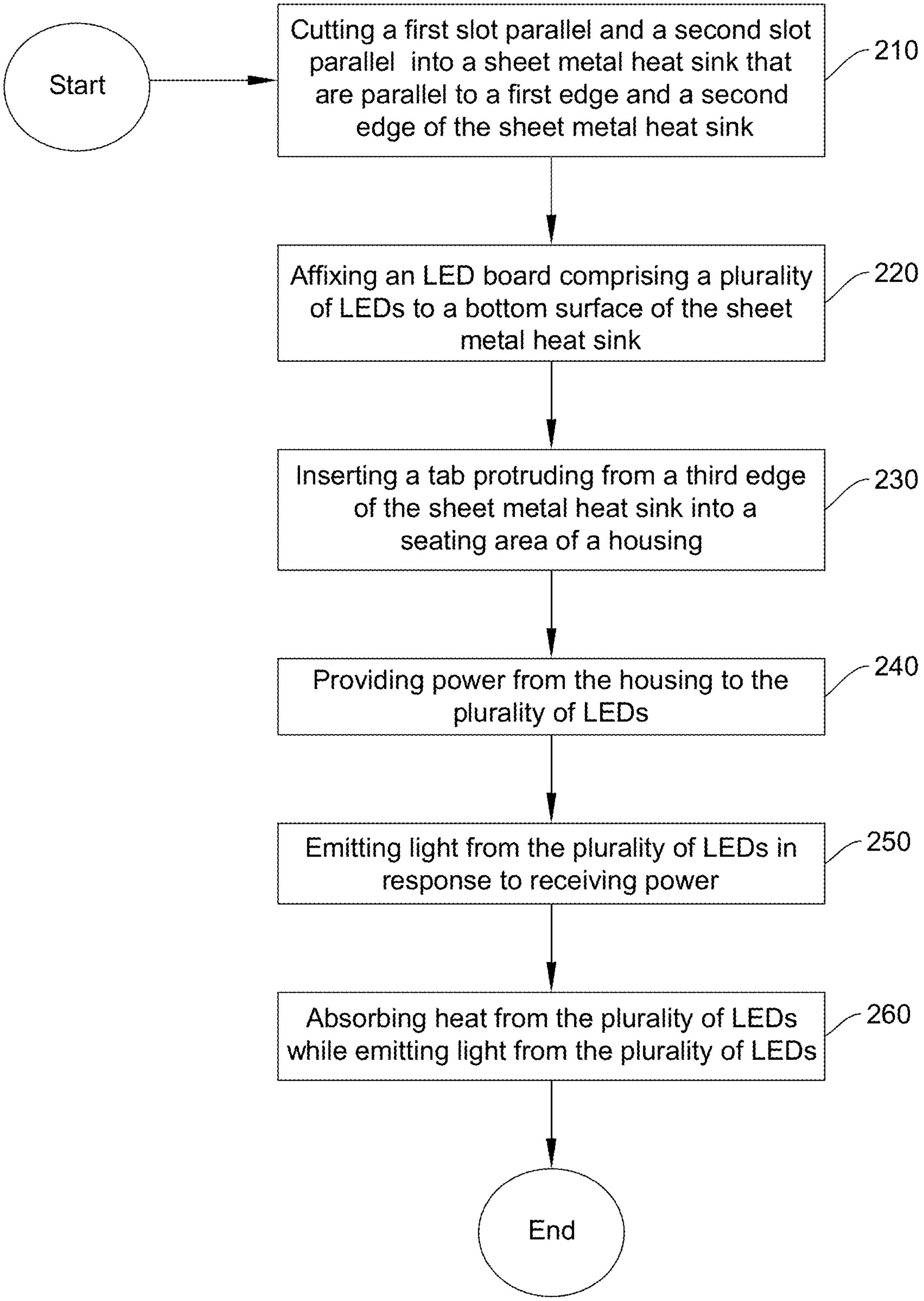
FIG. 12 is a flow diagram of a method in accordance with an embodiment of this disclosure.

Referring now to FIG. 12, there is illustrated a method in accordance with an embodiment of the disclosure. At 210, in a sheet metal heat sink 110 having a first edge 118*a* and a second edge 118*b* parallel to the first edge, a first slot 116 parallel to the first edge and a second slot 116 parallel to the second edge are cut. At 220, a light emitting diode (LED) board 120 is affixed to a bottom surface 110*a* of the sheet metal heat sink. At 230, a tab 114 protruding from a third edge 118*c* of the sheet metal heat sink is inserted into a seating area 138 of a housing. At 240, the housing 130 provides power to the plurality of LEDs. At 250, the plurality of LEDs emit light in response to receiving the power. At 260, the sheet metal heat sink absorbs heat from the plurality of LEDs while the plurality of LEDs emits light.

Certain embodiments advantageously allow for only a single screw to open and close the housing. Additionally, lower tooling investment is needed because of the user of the sheet metal heat sink. The sheet metal heat sink can be laser cut or water jet. Moreover, additional parts are either not needed or minimally need to generate good thermal contact. The LEDs can maintain a lower temperature that allows for higher performance and greater longevity.

According to an embodiment, an apparatus 100 comprises: a sheet metal heat sink 110 including: a first edge 118*a*; a second edge 118*b* substantially parallel to the first edge 118*a*; a third edge 118*c* between the first edge 118*a* and the second edge 118*b*; a first slot 116 forming a first corner 119*c* with the third edge 118*c* and substantially parallel to the first edge 118*a* and the second edge 118*b*; a second slot 116 forming a second corner 119*d* with the third edge 118*c* and substantially parallel to the first edge 118*a* and the second edge 118*b*; and a tab 114 protruding from the third edge 118*c*.

According to an embodiment, the sheet metal heat sink 110 comprises a material selected from a group consisting of copper, aluminum, silver, tungsten, and zinc.

According to an embodiment, the apparatus further comprises a light emitting diode (LED) board 120 comprising a plurality of LEDs 112 affixed to a bottom surface 100*a* of the sheet metal heat sink 110.

According to an embodiment, the sheet metal heat sink 110 comprises reinforcing bends 115 that corresponds to edges of the LED board 120.

According to an embodiment, the apparatus further comprises a housing 130 that includes a seating area 138 configured to receive the tab 114 of the sheet metal heat sink 110.

According to certain embodiments, the seating area 138 of the housing 130 includes two or more steps 139.

According to certain embodiments, the housing 130 includes a bracket 132 accommodating a screw 134.

According to certain embodiments, the housing 130 comprises electronic components that are configured to provide power to the plurality of LEDs 112, wherein the plurality of LEDs 112 are configured to provide light, and wherein the sheet metal heat sink 110 is configured to receive thermal energy from the plurality of LEDs 112.

According to certain embodiments, a method comprises: in a sheet metal heat sink 110 having a first edge 118*a* and a second edge 118*b* parallel to the first edge, cutting a first slot 116 parallel to the first edge and a second slot 116 parallel to the second edge (210); affixing a light emitting diode (LED) board 120 to a bottom surface 110*a* of sheet metal heat sink, the LED board comprising a plurality of LEDs 122 (220); inserting a tab 114 protruding from a third edge 118*c* of the sheet metal heat sink disposed between the first edge and the second edge into a seating area 138 of a housing (230); providing power from the housing 130 to the plurality of LEDs (240); emitting light from the plurality of LEDs in response to receiving the power (250); and absorbing heat from the plurality of LEDs while emitting light from the plurality of LEDs (260).

According to certain embodiments, the sheet metal heat sink comprises a material selected from a group consisting of copper, aluminum, silver, tungsten, and zinc.

According to certain embodiments, the first slot forms a first corner 119*a* with the third edge of the sheet metal heat sink, and wherein the second slot forms a second corner 119*b* with the third edge.

According to certain embodiments, the seating area comprises a two or more steps 139.

According to certain embodiments, the sheet metal heat sink comprises reinforcing bends 115 that correspond to edges of the light emitting diode board.

According to certain embodiments, the method further comprises fastening the housing to an external structure.

According to certain embodiments, the housing includes a bracket 132, wherein the housing is fastened to the external structure by screw 134.

While one or more embodiments of the disclosure have been described with reference to the figures, it will be understood by those of ordinary skill in the art that various changes in form and details may be made therein without departing from the spirit and scope as defined by the following claims.

What is claimed is:

1. An apparatus comprising:

a sheet metal heat sink including:
- a first side;
- a second side substantially parallel to the first side;
- a third edge between the first side and the second side;
- a first slot forming a first corner with the third edge and substantially parallel to the first side and the second side;
- a second slot forming a second corner (119*d*) with the third edge and substantially parallel to the first side (118*a*) and the second side; and
- a tab protruding from the third edge; and
- wherein the housing includes a bracket accommodating a screw or other fastening device.

2. The apparatus (100*l*) of claim 1, wherein the sheet metal heat sink comprises a material selected from a group consisting of copper, aluminum, silver, tungsten, and zinc.

3. The apparatus of claim 1, further comprising a light emitting diode (LED) board comprising a plurality of LEDs affixed to a bottom surface of the sheet metal heat sink.

4. The apparatus of claim 3, the sheet metal heat sink comprises reinforcing bends that correspond to edges of the LED board.

5. The apparatus of claim 1, further comprising a housing, the housing a seating area configured to receive the tab of the sheet metal heat sink.

6. The apparatus of claim 5, wherein the seating area of the housing includes two or more steps.

7. The apparatus of claim 1, further comprising a LED board comprising a plurality of LEDs 112 and affixed to a bottom surface of the sheet metal heat sink, wherein the housing comprises electronic components that are configured to provide power to the plurality of LEDs, wherein the plurality of LEDs are configured to provide light, and wherein the sheet metal heat sink is configured to receive thermal energy from the plurality of LEDs (112).

8. A method comprising:
- in a sheet metal heat sink having a first edge and a second edge parallel to the first edge, cutting a first slot parallel to the first edge and a second slot parallel to the second edge;
- affixing a light emitting diode (LED) board to a bottom surface (110*a*) of the sheet metal heat sink, the LED board comprising a plurality of LEDs (122) (220);
- inserting a tab protruding from a third edge of the sheet metal heat sink disposed between the first edge and the second edge into a seating area of a housing;
- providing power from the housing to the plurality of LEDs;
- emitting light from the plurality of LEDs in response to receiving the power; and
- absorbing heat from the plurality of LEDs while emitting light from the plurality of LEDs.

9. The method of claim 8, wherein the sheet metal heat sink comprises a material selected from a group consisting of copper, aluminum, silver, tungsten, and zinc.

10. The method of claim 8, wherein the first slot forms a first corner with the third edge of the sheet metal heat sink, and wherein the second slot forms a second corner with the third edge.

11. The method of claim 8, wherein the seating area comprises a two or more steps.

12. The method of claim 8, wherein the sheet metal heat sink comprises reinforcing bends that correspond to edges of the LED board.

13. The method of claim 8, further comprising:
fastening the housing to an external structure.

14. The method of claim 13, wherein the housing includes a bracket, wherein the housing is fastened to the external structure by screw or other fastening device.

* * * * *